(12) United States Patent
Errthum

(10) Patent No.: US 7,942,675 B1
(45) Date of Patent: May 17, 2011

(54) CALCULUS TEACHING AID

(76) Inventor: Emily Errthum, Milwaukee, WI (US)

( * ) Notice: Subject to any disclaimer, the term of this patent is extended or adjusted under 35 U.S.C. 154(b) by 612 days.

(21) Appl. No.: 11/934,368

(22) Filed: Nov. 2, 2007

(51) Int. Cl.
  *G09B 23/02* (2006.01)

(52) U.S. Cl. ........................................ 434/211

(58) Field of Classification Search .................. 434/188, 434/200, 211, 213, 214, 216
See application file for complete search history.

(56) References Cited

U.S. PATENT DOCUMENTS

| | | | | |
|---|---|---|---|---|
| 1,541,179 A * | 6/1925 | Parkinson | | 434/215 |
| 1,912,380 A * | 6/1933 | McCully | | 434/215 |
| 1,981,646 A * | 11/1934 | Hamley | | 434/211 |
| 3,083,475 A * | 4/1963 | Lepoudre | | 434/211 |
| 3,339,297 A * | 9/1967 | Stinn et al. | | 434/190 |
| 3,514,873 A * | 6/1970 | Stobbe | | 434/190 |
| 3,733,718 A * | 5/1973 | Hill et al. | | 434/216 |
| 4,373,917 A * | 2/1983 | Jackson | | 434/209 |
| 5,114,347 A * | 5/1992 | Camp | | 434/214 |
| 6,132,217 A * | 10/2000 | Dickson | | 434/211 |
| 6,213,779 B1 * | 4/2001 | Campbell et al. | | 434/211 |
| 7,500,852 B2 * | 3/2009 | Wolf et al. | | 434/188 |
| 2008/0108030 A1 * | 5/2008 | Bayne | | 434/188 |

* cited by examiner

*Primary Examiner* — Kurt Fernstrom
(74) *Attorney, Agent, or Firm* — Boyle Fredrickson, S.C.

(57) ABSTRACT

A calculus teaching aid includes a substrate, a plurality of visual components configured to define a two-dimensional graphical model of the first derivative, and a plurality of symbolic labels configured to define a variety of characteristics of the graphical model. The substrate, visual components and labels are preferably magnetized for secure attachment to one another. The calculus teaching aid may be configured in a plurality of different ways to demonstrate the various aspects of the first derivative.

17 Claims, 3 Drawing Sheets

CALCULUS TEACHING AID

BACKGROUND OF THE INVENTION

The present invention relates to a teaching aid for use in understanding and visualizing calculus concepts and specifically to a teaching aid adapted to aid students in understanding and visualizing the mathematical concept of the first derivative in calculus.

In calculus, the derivative is a measurement of how a function changes when the values of its inputs change. The derivative of a function at a chosen input value describes the best linear approximation of the function near that particular input value. For a real-valued function of a single real variable, the derivative of a point equals the slope of the tangent line to the graph of the function at that point.

Differentiation is a method used to compute the rate at which a quantity, y, changes with respect to the change in another quantity, x, upon which it is dependent. This rate of change is called the derivative of y with respect to x. The dependency of the variable y on x means that it is a function of x, which is represented by the variable f(x). Therefore, if x and y are real numbers, and if the graph of y is plotted against x, the derivative measures the slope of tangent lines to this graph at each point.

In teaching mathematical concepts, it is often helpful for students to utilize a visual model in order to better understand these concepts. For example, to better visualize the concept of derivatives, it is often helpful to graphically display the curve of a simple function. It has been found that students often have difficulty visualizing such concepts, and therefore have difficulty in understanding and solving such problems. Accordingly, the graphical representation of such concepts aids in the students learning.

It is therefore an object of the present invention to provide a calculus teaching aid for modeling the determination of a first derivative in order to assist students in visualizing the concept of the first derivative. It is a further object of the present invention to provide such an aid that can be adapted to show a variety of different models. Yet another object is to provide an aid comprising a plurality of different indicia configured to represent the various characteristics of the model. A further object of the present invention is to provide such an aid that is relatively simple in its construction yet which greatly enhances a student's ability to understand and visualize the concepts necessary to understand the various aspects of the first derivative.

SUMMARY OF THE INVENTION

In accordance with the invention, a calculus teaching aid for demonstrating the characteristics of the first derivative includes a substrate, a plurality of parts configured to represent a graph of the first derivative, and a plurality of symbolic labels having various indicia written on them for identifying various features of the graph. The parts and labels are generally selectively attachable to a surface of the substrate. The substrate is preferably substantially planar defining a rectangle or square and constructed of a plastic, metal, wood or other suitable material. Further, the substrate may be configured for use with parts and labels to ensure that the pieces and markers remain secured to the substrate, e.g. the substrate may be metal and the parts and labels may be magnetic.

The graphical parts and symbolic labels are adapted to be selectively secured to a surface of the substrate to visually represent a graph of a function having an input. The graphical pieces may include a plurality of curvilinear pieces for representing the actual graph as well as a plurality of circular pieces for representing particular points along the graph. The symbolic labels preferably include written indicia on an upper surface thereof. However, it is understood that the symbolic labels may be configured to be user-definable so that a variety of different information may be presented thereon. The symbolic labels may be used by the user to label the various information depicted by the graph defined by the graphical pieces to thereby make it easier to understand the graph.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF PREFERRED EMBODIMENTS

Figure 1:
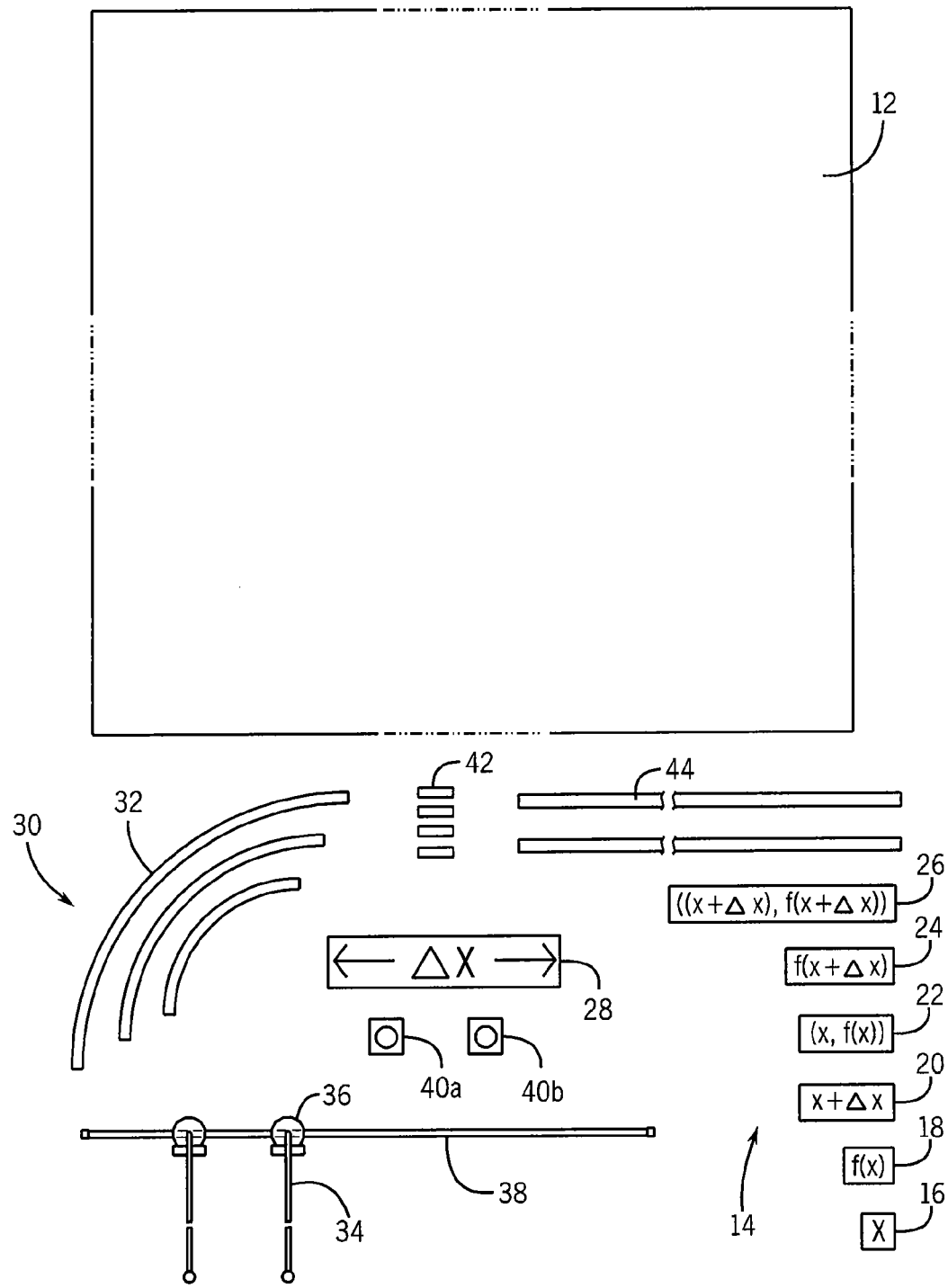
FIG. 1 is a top plan view of a calculus teaching aid constructed in accordance with the present invention.

Referring to the drawings, and initially to FIG. 1, a calculus teaching aid 10 in accordance with the present invention is illustrated. Calculus teaching aid 10 includes a substantially flat substrate 12 defining a rectangle or square, however, other suitable shapes may be utilized in practicing the present invention. Substrate 12 is preferably constructed of a magnetically attractive material, such as a ferrous metal or other satisfactory material. However, it is understood that other materials may be used for construction of substrate 12 such as, for example, Velcro, plastic and other non-metallic materials.

Calculus teaching aid 10 further comprises a plurality of labels 14 configured to be selectively attached and arranged on a surface of substrate 12. The labels 14 are preferably constructed of any satisfactory material, and may be magnetized for secure attachment to the magnetically attractive substrate 12, however, it is understood that labels 14 may be formed of any other suitable material.

Figure 2:
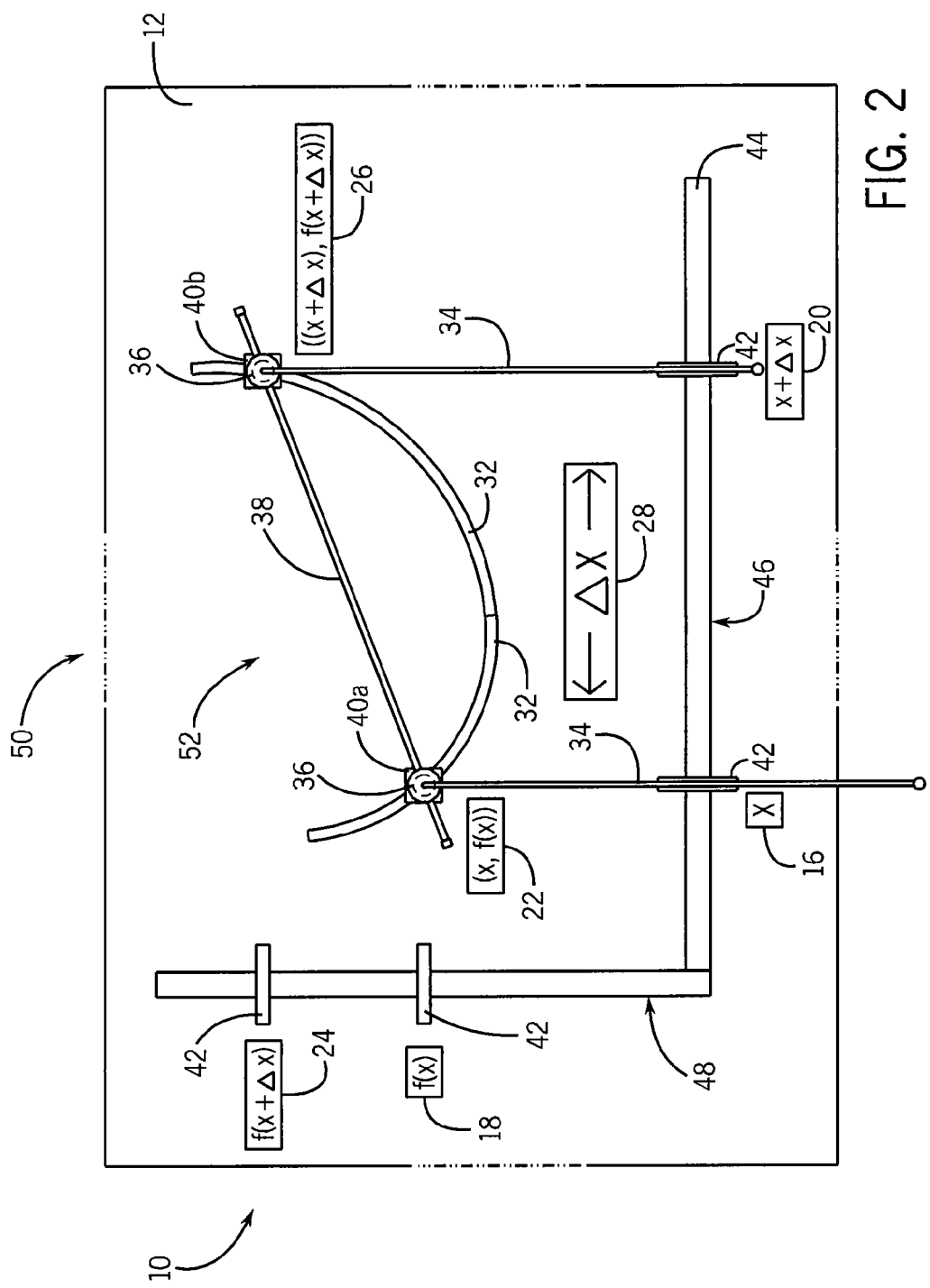
FIG. 2 is a top plan view of the calculus teaching aid of FIG. 1 demonstrating the determination of the average rate of change between two points of a function.
Figure 3:
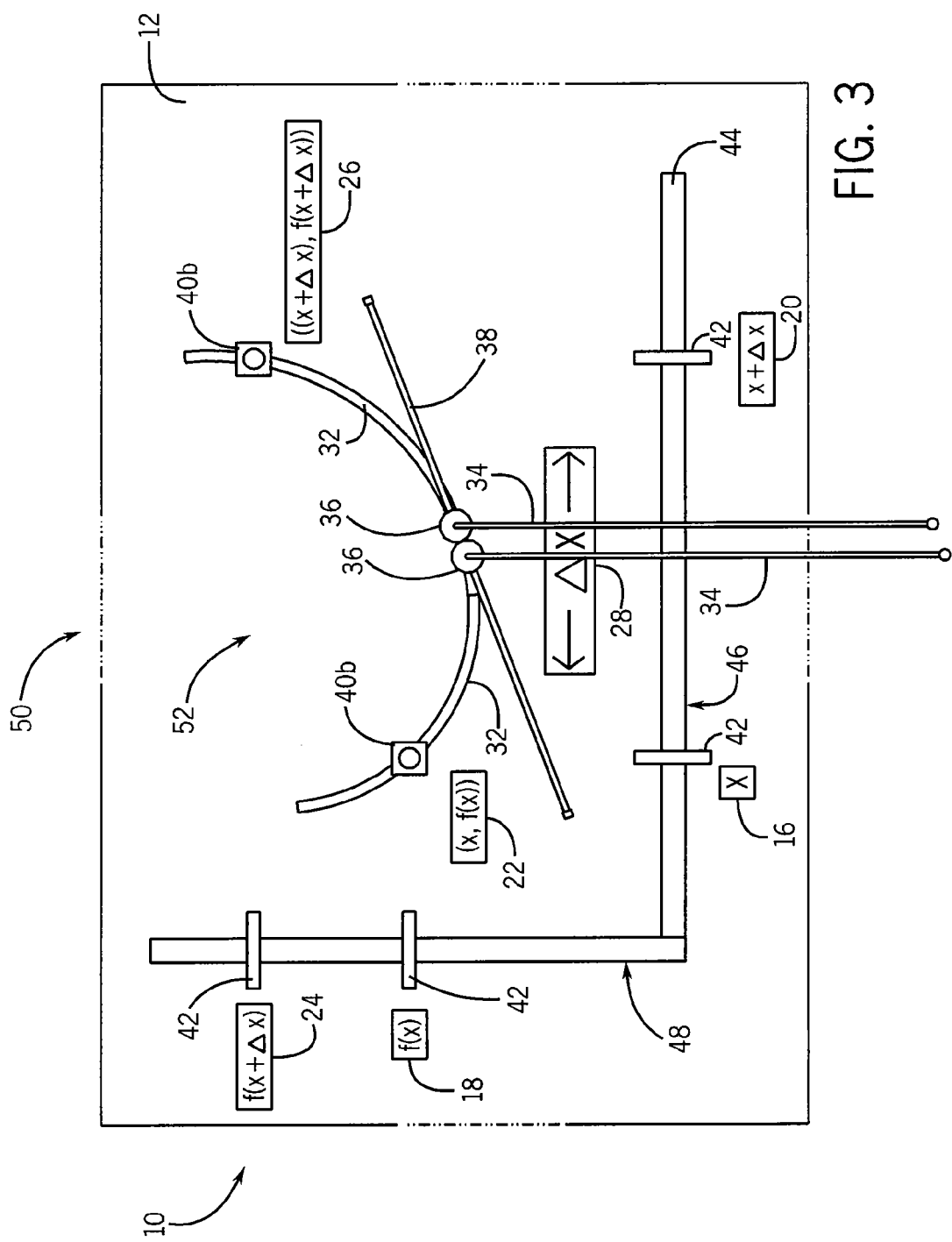
FIG. 3 is a top plan view of the calculus teaching aid of FIGS. 1 and 2 depicting the calculation of the derivative of the function represented.

Labels 14 preferably comprise a number of labels having different indicia written on surfaces thereof to visually represent various parts of the graph depicted in teaching aid 10. For example, as shown in FIGS. 1-3, labels 14 may comprise a label 16 including the text "x," a label 18 including the text "f(x)," a label 20 including the text "x+Δx," a label 22 including the text "(x, f(x))," a label 24 including the text "f(x+Δx)," a label 26 including the text "((x+Δx), f(x+Δx))," and a label 28 including the text "←Δx→." Although the labels 14 shown here have predetermined indicia written on them, it is understood that labels 14 may be configured for user customization.

Calculus teaching aid 10 further comprises a plurality of parts 30 configured to represent various aspects of a graph. Similar to labels 14, parts 30 are preferably constructed from a magnetized metal or the like but may alternatively be constructed of any material suitable for practicing the present invention.

Parts 30 preferably include at least one curvilinear member 32 and a pair of vertical strings 34 having attachment means 36 at one end thereof. While elements 34 are described as flexible members in the form of strings, it is also understood that the elements 34 may also be in the form of non-flexible members such as rods or the like. Attachment means 36 may comprise any suitable attachment means such as a clip, magnet, or other such suitable connector. Further, a movable rod 38 configured to be slidably coupled to attachment means 36 at a right angle to vertical string 34 is preferably provided. Attachment means 36 is also preferably selectively slidably attachable to curvilinear members 32 thereby enabling the movement of movable rod 38 to different positions on the graph.

A pair of circular members 40a, 40b may also be provided for representing two discrete points on the graph and may be selectively attachable to attachment means 36. A plurality of rectangular markers 42 are also preferably provided for indicating the position of circular members 40a, 40b along either of the axes of the graph. Finally, a generally L-shaped member 44 may be provided for representing the axes of the graph of the present invention. Alternatively, rather than utilizing a single L-shaped member 44, the present invention may utilize a two-piece structure adapted to be configured as the axes of the graph.

Referring now to FIGS. 2 and 3, and in particular FIG. 2, the calculus teaching aid 10 of the present invention is shown in operation. L-shaped member 44 is generally centrally positioned on substrate 12 to represent the x axis 46 and y axis 48 of a graph 50. A pair of curvilinear members 32 are centrally positioned to represent a curve 52 of the function shown in graph 50. Circular members 40a, 40b are positioned at two distinct points along curve 52 to represent two distinct points along the curve 52. Circular member 40a represents the point (x, f(x)) and is labeled by label 18 to convey this information to the user. Similarly, circular member 40b represents the point ((x+Δx), f(x+Δx)) and label 26 is positioned nearby to indicate this. Vertical strings 34 are shown with attachment means 36 coupled to circular members 40a and 40b such that vertical strings 34 extend in the y-direction of the graph. Rectangular markers 42 are placed at locations along the x-axis 46 to identify the positions of the circular markers 40a and 40b. Label 28 is positioned on the substrate 12 between the lengths of the vertical strings 34 to identify that the distance between circular member 40a and 40b is represented by the value Δx. Further, two additional rectangular markers 42 are placed along the y-axis of the graph to represent the positions f(x) and f(x+Δx) and labels 18 and 24 are located nearby to identify each position.

In FIG. 2, movable rod 38 is configured to define a secant line extending between circular markers 40a and 40b. A secant line is a straight line that intersects a curve at two or more discrete points along the curve. The slope of the secant line represents the average rate of change and is defined by Δy/Δx. As such, the slope of the secant line shown in FIG. 2 is equal to the (f(x+Δx)−f(x))/x+Δx−x, or (f(x+Δx)−f(x))/Δx).

Now turning to FIG. 3, the calculus teaching aid 10 of the present invention in operation is shown being used to graphically demonstrate the calculation of the first derivative of the function.

In mathematics, the first derivative represents the instantaneous rate of change, or the rate of change at a particular point along the curve of a function. The slope of the tangent line through the point is used to determine the instantaneous rate of change. The slope of the tangent line shown in FIG. 3, or first derivative, is represented by the following equation:

$$\lim_{\Delta x \to 0} (f(x+\Delta x) - f(x))/(\Delta x)$$

Thus, solving for the above limit will give the slope of the tangent line. However, because students often have difficulty understanding the concept of limits, the present invention aids by graphically demonstrating the concept.

The mean value theorem guarantees that there is at lease one point there where the slope of the tangent line equals the slope of the secant line provided the function is continuous and differentiable. As such, the present invention may demonstrate the concept of the mean value theorem through the visual depiction thereof as is described further below.

Specifically, calculus teaching aid 10 graphically demonstrates the above-noted principles by allowing the user to selectively slide attachment means 36 along curvilinear members 32 to a position where movable rod 38 acts as a tangent line through a single point on curve 52. As such, the vertical strings 34 become positioned nearer to one another with respect to the x-axis, thereby decreasing the value represented by the Δx or label 28. As such, the concept of using limits to calculate the slope of tangent line is graphically demonstrated. Accordingly, calculus teaching aid 10 illustrates the complicated principle of the first derivative through a rather simple mechanism.

The present invention has been described in terms of the preferred embodiment, and it is recognized that equivalents, alternatives, and modifications, aside from those expressly stated, are possible and within the scope of the appending claims.

What is claimed is:

1. A calculus teaching aid comprising:
a substrate;
a plurality of visual components configured to selectively represent a graphical depiction of a mathematical function, wherein the visual components are adapted for attachment to the substrate, wherein the plurality of visual components include one or more curve members; a linear member; and attachment means for selectively securing the linear member to the one or more curve members;
wherein a curve is defined by the one or more curve members when the one or more curve members are attached to the substrate, and wherein the attachment means secures the linear member to the curve at a pair of points on the curve, wherein the linear member extends between and intersects the curve at a pair of points along the length of the curve at the locations of the attachment means; and
a plurality of symbolic labels configured to be selectively attachable to the substrate, wherein the plurality of labels indicate attributes represented by the graphical depiction of the mathematical function.

2. The calculus teaching aid of claim 1 wherein the depicted mathematical function is configured to demonstrate calculation of a first derivative of the function.

3. The calculus teaching aid of claim 1 wherein the plurality of labels are selectively moveable on the substrate to represent a plurality of characteristics of the graphical depiction of the mathematical function.

4. The calculus teaching aid of claim 1 wherein at least one of the substrate, components and labels are magnetized, and wherein the substrate if formed of a magnetically attractive material, for securing the components and labels to the substrate.

5. The calculus teaching aid of claim 1 wherein the plurality of components further comprises a pair of indicator members, wherein each indicator member depends from a point at which the linear member intersects the curve.

6. The calculus teaching aid of claim 1 wherein the plurality of markers includes a plurality of markers including indicia, wherein the indicia are configured to represent a plurality of mathematical statements.

7. The calculus teaching aid of claim 1 wherein the substrate is substantially planar.

8. A method of modeling a first derivative in calculus comprising the steps of:
providing a substrate;
coupling a plurality of visual components to the substrate, wherein certain of the visual components form a curve on a pair of axes that represents a mathematical function;
securing a linear member to a pair of points on the curve, wherein the linear member extends between and intersects the curve at the pair of points along the length of the curve and defines a secant line representing the average rate of change between the pair of points on the curve;
indicating the pair of points at which the linear member intersects the curve on one of the axes; and
providing a plurality of symbolic labels on the substrate, wherein the symbolic labels represent elements of the curve.

9. The method of claim 6 wherein the step of securing the linear member to the pair of points on the curve is carried out via a pair of attachment members that are movable relative to the curve, wherein the linear member is movably engaged with the pair of attachment members.

10. The method of claim 9, further comprising the step of shifting the attachment members along the curve toward each other and together such that the linear member represents a tangent line on the curve.

11. The method of claim 8 further comprising the step of placing points along the curve to represent different inputs of the function represented by the curve.

12. A method of modeling a first derivative in calculus comprising the steps of:
providing a substrate;
coupling a plurality of separate visual components to the substrate, wherein the visual components generally form a curve representing a mathematical function;
attaching a plurality of symbolic labels to the substrate, wherein the symbolic labels are configured to represent elements of the curve;
placing a linear member defining a secant line through at least two points on the curve, wherein the secant line is configured to represent the average rate of change between the at least two points;
shifting the secant line to intersect a single point along the curve thereby defining a tangent line through the single point; and
providing a pair of vertical members having attachment means at one end thereof, wherein the attachment means are removably coupled to the points to form a secant line therethrough.

13. A method of modeling a first derivative in calculus comprising the steps of:
providing a substrate;
coupling a plurality of separate visual components to the substrate, wherein the visual components generally form a curve representing a mathematical function;
attaching a plurality of symbolic labels to the substrate, wherein the symbolic labels are configured to represent elements of the curve;
placing points along the curve to represent different inputs of the function represented by the curve; and
sliding the attachment means along the curve, wherein the attachment means abut one another along the curve thereby representing a value approaching a second value.

14. A kit for teaching mathematical concept of the first derivative comprising:
a substrate;
a plurality of configurable visual components selectively attachable to the substrate, wherein the plurality of visual components include one or more curve members;
a linear member; and attachment means for selectively securing the linear member to the one or more curve members;
wherein a curve is defined by the one or more curve members when the one or more curve members are attached to the substrate, and wherein the attachment means secures the linear member to the curve at a pair of points on the curve, wherein the linear member extends between and intersects the curve at a pair of points along the length of the curve at the locations of the attachment means; and
a plurality of symbolic labels having varying indicia applied to a surface thereof, wherein the symbolic labels are selectively attachable to the substrate.

15. The kit of claim 14 wherein the plurality of symbolic labels are configured to identify particular characteristics of the configurable visual components.

16. The kit of claim 15 wherein the configurable visual components further comprises a pair of indicator members, wherein each indicator member depends from a point at which the linear member intersects the curve.

17. The kit of claim 14, wherein the configurable visual components comprise a generally L-shaped member representing axes of a graph.

* * * * *